(12) United States Patent
Valeria

(10) Patent No.: US 7,197,715 B1
(45) Date of Patent: Mar. 27, 2007

(54) SYSTEM AND METHOD TO PROVIDE CUSTOMIZED GRAPHICAL USER INTERFACES VIA AN INTERACTIVE VIDEO CASTING NETWORK

(75) Inventor: Brandon L. Valeria, Redmond, WA (US)

(73) Assignee: Digeo, Inc., Kirkland, WA (US)

(*) Notice: Subject to any disclaimer, the term of this patent is extended or adjusted under 35 U.S.C. 154(b) by 689 days.

(21) Appl. No.: 10/112,666

(22) Filed: Mar. 29, 2002

(51) Int. Cl.
G06F 3/00 (2006.01)
G06F 3/14 (2006.01)
H04N 7/173 (2006.01)

(52) U.S. Cl. ............ 715/747; 715/719; 715/745; 715/765; 725/37; 725/46; 725/47; 725/59

(58) Field of Classification Search ............ 715/738, 715/760, 764, 767, 781, 784, 810, 835, 44–48, 715/52, 54, 513, 716, 719, 744–747, 765; 725/37, 39, 46, 47–49, 51, 56, 59, 61, 86, 725/91, 109–111
See application file for complete search history.

(56) References Cited

U.S. PATENT DOCUMENTS

| | | | |
|---|---|---|---|
| 5,905,492 A | 5/1999 | Straub et al. ............... 345/333 |
| 6,061,695 A | 5/2000 | Slivka et al. ............... 707/513 |
| 6,091,411 A | 7/2000 | Straub et al. ............... 345/333 |
| 6,195,692 B1 | 2/2001 | Hsu ............................ 709/219 |
| 6,239,795 B1 | 5/2001 | Ulrich et al. ............... 345/333 |
| 6,292,187 B1* | 9/2001 | Gibbs et al. ................ 715/804 |
| 6,295,057 B1 | 9/2001 | Rosin et al. ................ 345/335 |
| 6,421,067 B1* | 7/2002 | Kamen et al. .............. 715/719 |
| 6,658,661 B1* | 12/2003 | Arsenault et al. ............ 725/54 |
| 6,731,310 B2* | 5/2004 | Craycroft et al. ............ 715/765 |
| 6,857,128 B1* | 2/2005 | Borden et al. ............... 725/39 |
| 2001/0049823 A1* | 12/2001 | Matey |
| 2002/0026642 A1* | 2/2002 | Augenbraun et al. ....... 725/109 |

(Continued)

FOREIGN PATENT DOCUMENTS

EP 1161085 * 5/2001

(Continued)

OTHER PUBLICATIONS

Web pages printed from www.winamp.com, "Offering a big salute to our neighbor to the north," copyright 2002, Nullsoft, Inc., printed on Mar. 21, 2002.

(Continued)

Primary Examiner—Lucila X. Bautista
(74) Attorney, Agent, or Firm—Darby & Darby PC; Bruce E. Black

(57) ABSTRACT

A graphical user interface (GUI) for an interactive video casting network can be provided that is capable of being customized per element or as a scene of one channel or universally on all channels. For example, a user can select a desired appearance (e.g., a skin or schema) of individual elements related to a channel, such as scroll bars, backgrounds, icons, GIFs, menus, and the like. Alternatively or in addition, a user may choose to customize the appearance of items/elements such as graphical overlays, pop-up screens, trigger indicators, buttons, interactive applications, web pages, and the like. Non-exhaustive and non-limiting examples of skin themes may include, space, travel, animals, architecture, cartoons, etc. The skins may include settings related to shapes, color and pattern schemes, graphics, animation, and other variations.

39 Claims, 7 Drawing Sheets

U.S. PATENT DOCUMENTS

| | | | |
|---|---|---|---|
| 2002/0067376 A1* | 6/2002 | Martin et al. ............... 345/810 |
| 2002/0070978 A1* | 6/2002 | Wishoff et al. |
| 2002/0171940 A1* | 11/2002 | Clernock et al. |
| 2003/0005453 A1* | 1/2003 | Rodriquez et al. ............ 725/87 |
| 2003/0018755 A1* | 1/2003 | Masterson et al. |
| 2003/0056218 A1* | 3/2003 | Wingard et al. .............. 725/46 |
| 2003/0058948 A1* | 3/2003 | Kelly et al. |
| 2003/0079226 A1* | 4/2003 | Barrett ........................ 725/46 |
| 2003/0084443 A1* | 5/2003 | Laughlin et al. .............. 725/39 |
| 2003/0115612 A1* | 6/2003 | Mao et al. ................... 725/136 |
| 2004/0107439 A1* | 6/2004 | Hassell et al. |
| 2005/0015804 A1* | 1/2005 | LaJoie et al. ................. 725/44 |
| 2006/0059525 A1* | 3/2006 | Jerding et al. |

OTHER PUBLICATIONS

Web pages printed from http://corp.odigo.com/, "Instant Messaging and Presence Solutions," copyright 1999-2000, Odigo, Inc., printed on Mar. 21, 2002.

* cited by examiner

SYSTEM AND METHOD TO PROVIDE CUSTOMIZED GRAPHICAL USER INTERFACES VIA AN INTERACTIVE VIDEO CASTING NETWORK

BACKGROUND OF THE INVENTION

1. Field of the Invention

This disclosure relates generally to customization of graphical user interfaces, and in particular but not exclusively, relates to customization of graphical user interfaces for channels and for other features available in an interactive video casting network.

2. Description of the Related Art

Graphical user interfaces (GUIs) are program interfaces that allow users to more easily communicate with their computers. Typical examples are the interfaces of the Microsoft Windows™ and Macintosh™ operating systems that utilize icons, windows, menus, pointers, and other graphical elements. This visual interface eliminates the need for the user to enter complex text-based commands to run applications, since such GUIs typically provide "point and click" functionality. The Microsoft Windows™ GUI, as well as those of other operating systems, groups the icons together in a "desktop" that simulates a desktop environment. Users can move icons around the desktop and create icons for files, windows, commands, etc.

Add-on software exists for Microsoft Windows™ that allows the user to use a theme to change the appearance of the GUI. For example, a wallpaper (such as a picture or pattern that serves as a background for a web page or desktop) can be changed, as can icons, screen savers, mouse pointers, etc., according to user-selection of choices from a menu (e.g., space, travel, jungle, sports, and the like). An audio or graphics file that can change the appearance of the user interface is sometimes called a "skin." When a skin is used or changed, the underlying functions of a program do not change—only the appearance of the user interface changes. Many skins can be downloaded from Internet sites that provide them free of charge.

Popular uses of skins include use with WinAmp, which is a media player for Microsoft Windows™. A WinAmp skin can change the appearance of the display, background, fonts, equalizer, control panel, sound of any tones, and other features of the media player display. A user can select from over 3,000 skins available from various Internet sites for WinAmp. Similarly, Odigo, which a cross-platform instant messaging (IM) service, offers a pop-up window that can use various skins. For example, one skin for the IM window has a "soccer theme." The entire window appears as a green soccer field, with the players in the middle as small characters labeled with the names of the user's IM "buddies." Icons are customized to this theme (e.g., the icon for the volume control appears as a loudspeaker that is present on the soccer field).

The popularity of skins demonstrates that many users enjoy the use of personalized applications. Skins are also useful from a marketing perspective, as users are more likely to return to a service or site where they have invested time into customizing and choosing a skin, and have thus become familiar with the GUI due to the customization that they have performed. Unfortunately, however, skins are missing or very limited for many interactive applications that may be available via interactive television. Viewers watching television or multimedia often may not have an opportunity to customize a user interface because the option is unavailable—most customization for interactive television applications is primitive (e.g., the user's name might be displayed in a simplistic banner).

With the increasing popularity of interactive television and with the potentially large number of interactive applications, commerce and advertising opportunities, variety of content and subject matter, etc. that can be made available with interactive television, it will become increasingly important for advertisers, interactive television service providers, and other parties to attract and keep the viewer's attention. In other words, "stickiness" will become more difficult to attain due to the wide variety of subject matter competing for the viewer's attention and due to the limited customization capability of current systems (e.g., the viewer will not be inclined to stay with any particular service, since moving to another service may not necessarily have the inconvenience of requiring the viewer to re-set customization preferences).

Accordingly, improvements are needed in techniques for providing customized graphical user interfaces in interactive television systems.

BRIEF DESCRIPTION OF THE SEVERAL VIEWS OF THE DRAWING(S)

Non-limiting and non-exhaustive embodiments of the present invention are described with reference to the following figures, wherein like reference numerals refer to like parts throughout the various views unless otherwise specified.

DETAILED DESCRIPTION

Figure 1:
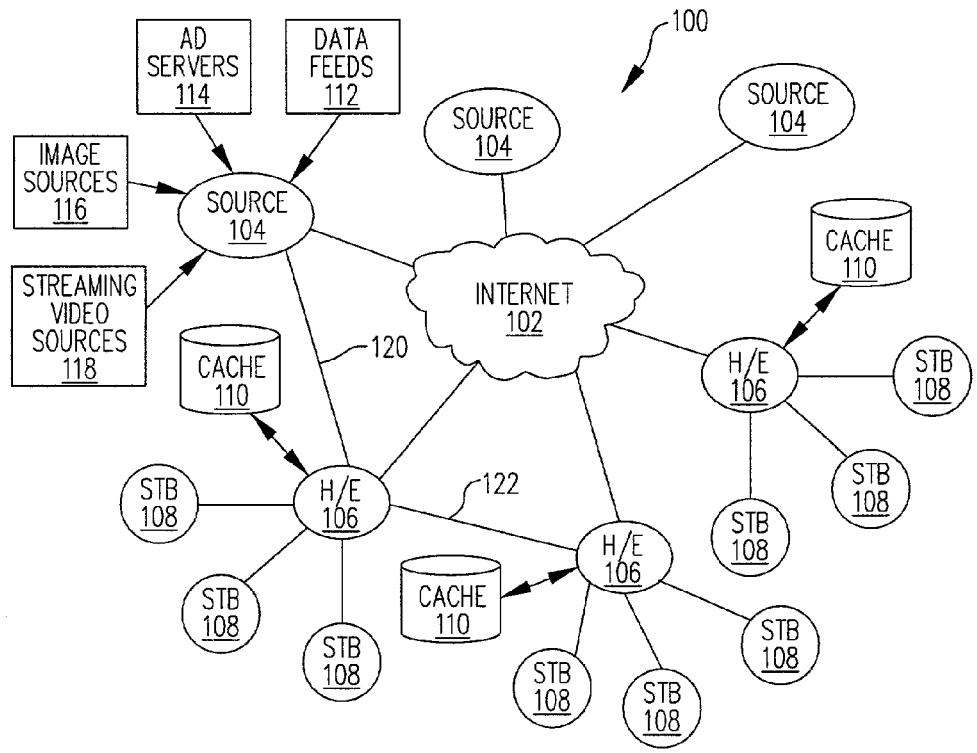
FIG. 1 shows an example of an interactive casting system that can implement an embodiment of the invention.

Embodiments of a system and method to provide customized graphical user interfaces for an interactive video casting network, such as an interactive television network, are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment of the invention can provide a graphical user interface (GUI) for an interactive video casting network that is capable of being customized per element, as a scene of one channel, or universally on all channels. For example, a user can select a desired appearance (e.g., a skin or schema) of individual elements related to a channel or channels, such as scroll bars, backgrounds, icons, GIFs, menus, and the like. Alternatively or in addition, a user may choose to customize the appearance of items/elements of services provided through the interactive video casting network, such as graphical overlays, pop-up screens, trigger indicators, buttons, interactive applications, a ticker, web pages, and the like. Non-exhaustive and non-limiting examples of skin themes may include, space, travel, animals, architecture, cartoons, etc. The skins may include settings related to shapes, color and pattern schemes, graphics, animation, and a multitude of other variations.

In one embodiment, the user can specify skin preferences via use of an on-screen menu, such as a "settings" menu. These preferences can be stored locally at a client terminal or at a server coupled to a head-end. The various skins themselves may also be stored locally at the client terminal, accessed at a server, sent/downloaded to the client terminal, or any suitable combination thereof. In one embodiment, identification of elements in a GUI that are replaceable by customized skins (as well as the resulting process to obtain the customized skins) can be performed via use of triggers or packet identifiers (PIDs) in a Motion Pictures Experts Group (MPEG) stream.

The ability to provide customized skins in the interactive television context allows users to desirably conform the look and feel of the interactive experience to their personal tastes. Moreover, providing this feature to users increases "stickiness," as users will invest time and effort into customization, and thus may be less likely to switch to another service where they may need to re-configure their settings.

FIG. 1 shows an example of an interactive video casting system 100 for distributing interactive content in addition to television content. The interactive video casting system 100 can comprise an interactive television system, as one example of a system that can implement an embodiment of the invention to provide customized GUIs for a viewer.

In accordance with an embodiment of the present invention, the system 100 can be integrated with a cable television distribution system. The system 100 includes an Internet 102, a plurality of content sources 104, a plurality of distribution centers or broadcast centers (depicted as head-ends or H/Es 106), and a plurality of client terminals 108 (depicted as STBs). In addition, a content source 104 is depicted as receiving data from data feeds 112, advertisement servers 114, image sources 116, and streaming video sources 118. The plurality of content sources 104 is coupled to the Internet 102. For example, a content source 104 may comprise a web site portal such as Go2Net.com™, or a news web site such as CNN.com™, or other types of sources, including web servers and the web content (such as web pages) stored in the web servers. Each content source 104 may have various data feeds 112, servers 114, and sources 116/118 coupled to it.

For example, news or stock quote feeds 112 may be fed into the content source 104. Servers 114 may provide advertisements for insertion into multimedia content delivered by the content source 104. Sources 116/118 may provide images 116, streaming video 118, and other content to the content source 104. Various other feeds, servers and sources may also be coupled to the content source 104 of FIG. 1.

The Internet 102 comprises a network of networks and is well known in the art. Communications over the Internet 102 can be accomplished using standard protocols such as transmission control protocol/internet protocol (TCP/IP), hypertext transfer protocol (HTTP), file transfer protocol (FTP), or other suitable protocols. The Internet 102 is coupled to the plurality of distribution centers 106, and each distribution center 106 is in turn coupled to a plurality of client terminals 108, which may comprise a set top box, a PC, an interactive television set, or another type of communication device or display device. The client terminals 108 may include or be coupled to a machine-readable medium that stores software or other machine-readable instructions to that operate to provide customized GUIs, as will be described later below.

In alternative or in addition to the Internet 102 being used to distribute multimedia content from the content sources 104 to distribution centers 106, communications channels or networks 120 apart from the Internet 102 may couple one or more content sources 104 to one or more distribution centers 106. A first dashed line 120 in FIG. 1 illustrates one example of such an alternate path for communications. Alternately or additionally, peering connections may exist between distribution centers 106. A second dashed line 122 in FIG. 1 illustrates one example of such peering. Other configurations are also possible and are included within the scope of the present invention.

Caches 110 may be provided at (or otherwise coupled to) the distribution centers 106. Such caches 110 may be used to increase the performance in the delivery of multimedia content to the client terminals 108. For example, larger files for video and other high bandwidth content may be stored in such caches 110, which may be closer to the client terminals 108 than to the content sources 104. In addition, reliability and guaranteed bandwidth may be provided because the Internet 102 is not in-between such caches 110 and the client terminals 108.

In an embodiment, servers may be present in the distribution centers 106, with such servers including or otherwise coupled to the caches 110. Alternatively or in addition, these servers may be located remotely from, but still communicatively coupled to, the distribution centers 106, such as in the Internet 102. Such servers and caches 110 may store skins that a viewer can choose from, in an embodiment.

According to various embodiments, some of these servers may provide data, such as via a Data Over Cable Service Interface Specifications (DOCSIS) channel, or other data via other communications paths to the client terminals 108. In one embodiment, television programs and applications can be provided to the client terminals 108 via MPEG-2 (or simply "MPEG") formatted transmissions, where the applications include elements that may be replaced with customized schemas.

The terms "application" or "interactive application" as used herein are intended to generally include code, text and graphics resources, and related functionality that can be provided to a viewer wishing to participate in an interactive experience. As an example, if a viewer activates/clicks on a displayed trigger to pursue a purchase opportunity, the resulting user interface that is rendered to allow the viewer to view selections, make entries, etc. is one type of application. Another type of application is a synthetic channel, which in one embodiment comprises a web site or other location identifiable with an address and accessible from a channel line-up. For instance, if the viewer responds to a trigger prompting the viewer to review player statistics during halftime of a football game, the synthetic channel (and the statistics) that are presented form part of the application. Applications can also include email, instant messaging, Internet browsing, or other activities or services that are different from "television programming."

Via MPEG streams in one embodiment, interactive applications or other services having elements that may be replaced with customized skins/schemas (as well as the skins themselves) may also be provided to the client terminals 108 via use of program identifiers (PIDs) and/or triggers. That is, information (data, application code, and skin schemas) is transmitted via the MPEG data stream to the client terminal 108. By burying the data, application code, and skin schemas within an MPEG stream as sets of information with unique PIDs associated with them, the information to start and run an application, and to replace elements therein with customized skins, is transmitted to the client terminal 108 (for implementations where the application and customized skins are not already locally present at the client terminal 108).

MPEG transport streams can contain information for several interactive applications interleaved with each other (these could be any combination of audio, video, or data programs) in one embodiment. There is a header on each packet within the MPEG stream that includes a "Program ID" field that tells an MPEG decoder in the client terminal 108 which particular application the packet belongs to. Thus, if an application channel of the system 100 is continuously doing a carousel transmission of all of the available interactive applications, the client terminal 108 picks the right application and data through distinct markers in the MPEG stream that identify the application.

In one embodiment, the MPEG stream may include a specific PID to identify elements in the application(s) that can be customized with skin schemas. Then, the client terminal 108 can pick off packets (having the customized schemas) from a carousel stream that correspond to that PID, and then present the customized schemas in the application, thereby replacing the schemas for the original elements. Alternatively or in addition, the downloaded application itself may instruct the client terminal 108 when and where to obtain the customized schemas.

Figure 2:
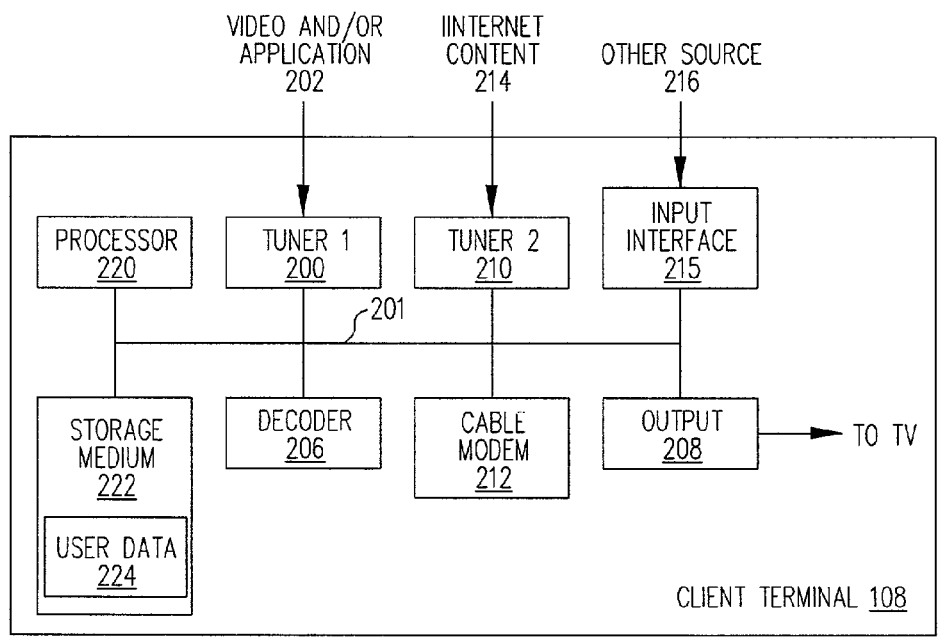
FIG. 2 is a block diagram of an example client terminal for the interactive video casting system of FIG. 1 that can implement an embodiment of the invention.

FIG. 2 is a block diagram of an embodiment of a client terminal 108 for the system 100 of FIG. 1 that can implement an embodiment of the invention. For the sake of simplicity of illustration and explanation, only the components that are germane to understanding an embodiment of the invention are shown in FIG. 2. It is understood that the embodiment of the client terminal 108 shown in FIG. 2 can have other components. Moreover, the various illustrated components may be suitably combined in some embodiments, instead of being separate. A bus 201 is shown symbolically to depict coupling between the various components.

The client terminal 108 comprises a first tuner 200 to tune to a television signal, MPEG stream 202, or other video source. The stream 202 may include video, live transmission, application code, and/or text and graphic resources (including resources that may form part of a customized skin). One skilled in the art will recognize that there will be a plurality of streams 202, depending on the number of channels and programs that the cable service provider makes available to the client terminal 108. For instance, one of the streams can comprise a carousel transmission stream of various skins (e.g., from a carousel broadcast server) that may be picked off and used in connection with customizing a user interface.

The first tuner 200 is coupled to a decoder 206 that decodes the video, applications, and resources, into a format that is compatible with a television set coupled to the client terminal 108. The client terminal 108 may include a second tuner 210. The second tuner 210 can work in conjunction with a cable modem 212 to obtain content from the Internet 102, such as via a DOCSIS channel. More specifically, in an embodiment of the invention, the second tuner 210 and the cable modem 212 can obtain Internet content or other data via a second source 214, including but not limited to, web pages, graphics, animation files, or other resources that can be used for customized skins and that are sent from the Internet 102, from a multiple system operator (MSO), or from some other source. It is to be appreciated that some of this data may arrive by way of the first tuner 200, such as via triggers for instance, additionally or alternatively to the second tuner 210.

An embodiment of the client terminal 108 may include a processor 220 to control operation of the various components shown in FIG. 2. The processor 220 may work in conjunction with software or other machine-readable instructions stored on a machine-readable storage medium 222. Such software may cooperate with the processor 220 to modify or process the content and/or appearance of data for display, to control the tuners to tune to a data source, select and retrieve data to display, and so on.

In addition, the client terminal 108 includes or is coupled to a third tuner or other input interface 215. In an embodiment, the third tuner 215 can be an out-of-band-tuner capable to receive miscellaneous data for eventual display on the display for a client terminal. As an example, the tuner 215 can receive data that can also be received from a DOCSIS channel (e.g., graphics, animation files, and other data that may be used in connection with customization of skins). Other examples of data capable to be received can include messages from an MSO, such as communications relevant to the viewer's skin preferences settings. In some embodiments, instead of or in addition to this third tuner, the input interface 215 can comprise a network interface or other communication interface. Examples include a telephone interface to a voicemail system; an interface to a personal computer, audio system (e.g., CD players, home entertainment system, and the like), video recorder/player device, data storage system (e.g., hard disks, CDs, and the like); and so forth.

In an embodiment of the invention, a storage medium 222 can store user preferences 224, alternatively or in addition to having such data stored at the cache(s) 110, at the cable head-end 106 or any other suitable location. User preferences can include data related to preferred skins in one embodiment, such as user settings as to which skins to present and how, the skins themselves, and so forth.

Figure 3:
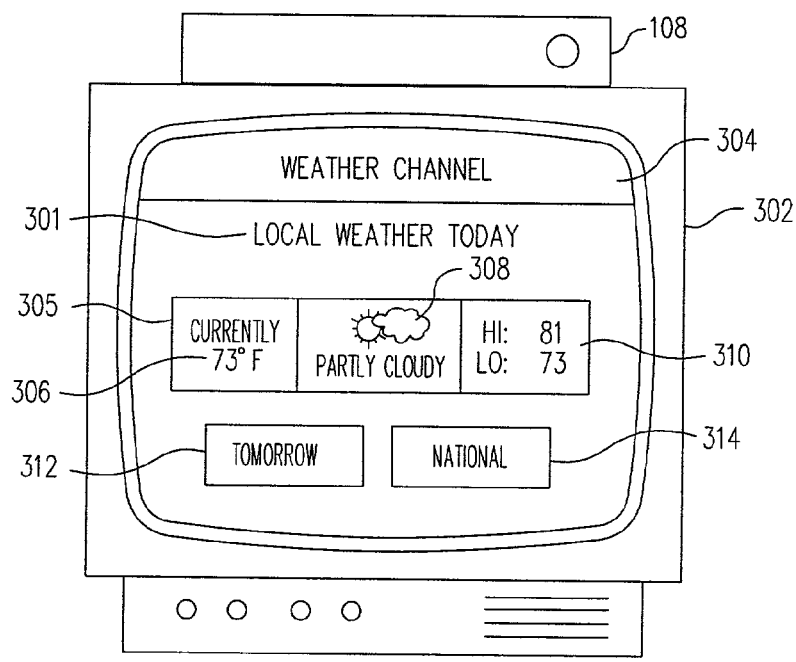
FIGS. 3–8 illustrate example uses of customized graphical user interface features for the interactive video casting system of FIG. 1.

FIGS. 3–8 illustrate example uses of customized graphical user interfaces (e.g., skins) in accordance with various embodiments of the invention. In FIG. 3, a television set 302 is tuned to a weather channel 304 that displays information about local weather. A client terminal 108, such as a set top box, rests upon the television set 302. The weather channel 304, in one embodiment, can comprise a service such as a synthetic channel operated by the MSO, and accessible via a uniform resource locator (URL) address tuned to by the cable modem 212 by way of the second tuner 210. The user interface shown in FIG. 3 for the weather channel 304 can be generated through a template, such as when an application for the weather channel 304 is loaded from the system 100. In other embodiments, the weather channel 304 can comprise a broadcast television channel, rather than a synthetic channel.

In this example, a graphical user interface element in the form of a "Local Weather Today" heading 301 is indicative of subject matter contained in a row of windows 305. The row of windows 305 comprises three smaller windows 306, 308, and 310 displaying, respectively, a current temperature reading of 73 degrees, images of a sun and cloud (indicating that weather conditions are partly cloudy), and a range of temperatures to be expected (e.g., a high temperature of 81 degrees and an expected low temperature of 73 degrees). An interactive button 312, if selected via clicking, may result in presentation of tomorrow's weather. Another interactive button 314 may result in presentation of national weather, if clicked. The buttons 312 and 314 may be embodied as hypertext links in one embodiment. Such a display, including a combination of text and graphics displayed in various windows and/or areas of a screen, as illustrated in FIG. 3, is one example of a web site or a synthetic channel template that offers information according to the subject matter of the particular channel.

Figure 4:
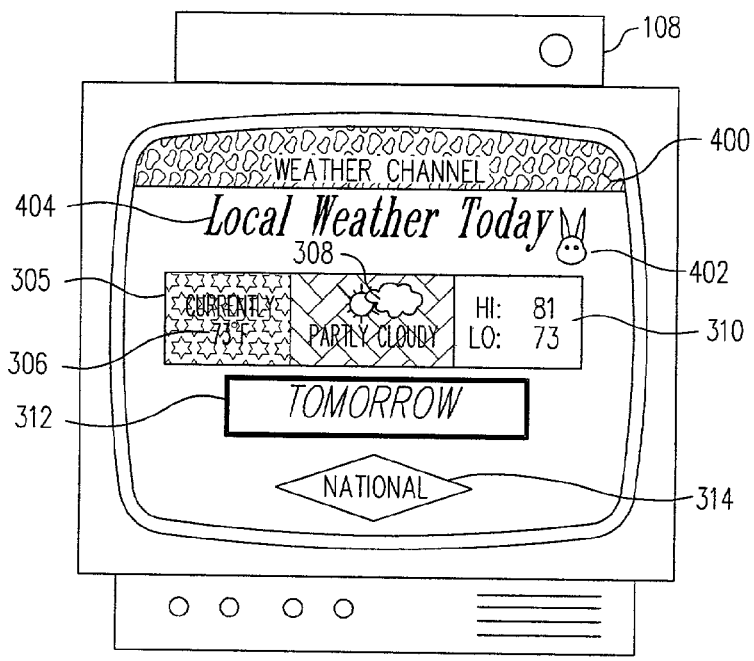

FIG. 4 illustrates, according to an embodiment, a customization of the appearance of the weather channel 304. In this example, individual user interface elements of the weather channel 304 have been customized by the user. For example, different windows may be displayed with different skins. In FIG. 4, an area 400 may display a "leopard skin" background in contrast to the plain background as displayed in FIG. 3. Additionally, the windows 305, 308, and 310 now display different backgrounds.

In an embodiment, animation and/or additional graphics may be added. For instance, an image 402 (such as an animated GIF image that moves across the screen) may be added by the user as part of the skin customization. As another possibility, the user can change the font and style of the displayed text. For instance in FIG. 4, "Local Weather Today" has been modified to cursive format at 404. Various elements may also be re-sized or re-arranged according to viewer preferences. For example, the button 312 has been customized by the user to be larger in size, drawn with a thicker border, and with the "Tomorrow" label drawn in bold and italics. The button 314 for national weather has been customized to have a new shape of a diamond. As can be further noted, both the buttons 312 and 314 have been re-positioned/re-arranged in the user interface of the weather channel 304, in accordance with the user's preferences. The underlying operational features may be mapped to the new positions of the buttons 312 and 314.

It is to be appreciated that although the elements 312 and 314 are referred to herein as "buttons" that, if pressed, result in presentation of local forecast and national forecast weather information, other techniques for presenting information may be used. For instance, the elements 312 or 314 can comprise a "ticker" suitably located on the display screen of the television set 302 that scroll the relevant information. In an embodiment of the invention, customized skins can be provided to the ticker(s).

In an embodiment, the template for the weather channel 304 can specify that various elements in the user interface are customizable. That is, the front-end template can be provided by way of an application that specifies where specific information, such as the temperature or a window, is to be displayed. The application may further specify that the window or text for the temperature is customizable based on a user setting, which may be accessed by the application when the template is being rendered on the television 302. Various techniques to accomplish this are described later below.

Figure 5:
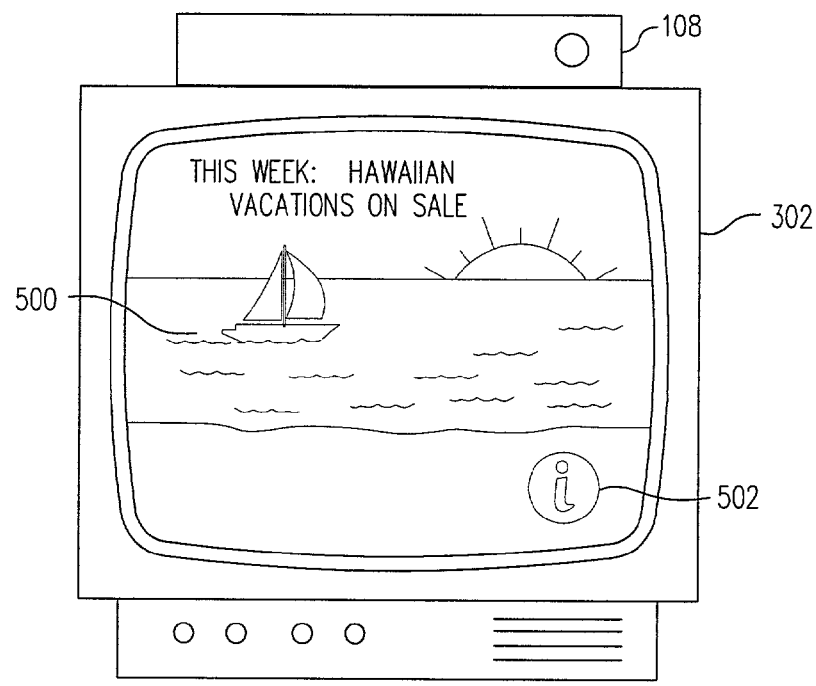
Figure 6:
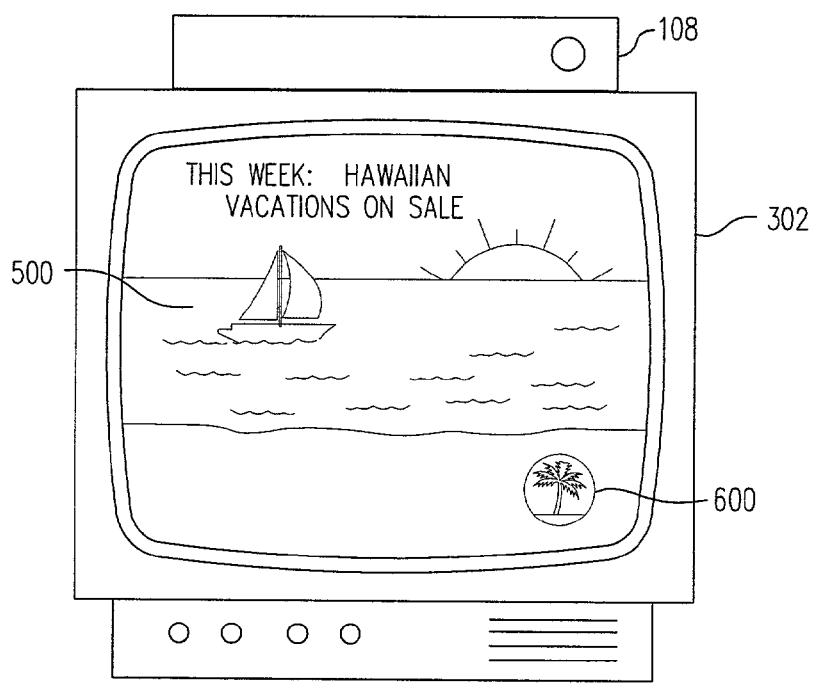

FIGS. 5–6 illustrate use of customized skins in connection with triggers in accordance with an embodiment of the invention. FIG. 5 shows a television commercial 500, such as a commercial for a Hawaiian vacation, presented on the television 302. A trigger may accompany the television commercial 500, embodied as an on-screen indicator 502 in the form of an "i," which alerts the viewer of availability of a service that provides additional information and/or an e-commerce opportunity related to the Hawaiian vacation. Various techniques familiar to those skilled in the art may be employed to provide the trigger for the indicator 502, including Advanced Television Enhancement Forum (ATVEF) or Wink™ triggers.

FIG. 6 shows the indicator 502 replaced with a different indicator 600, in the form of a "palm tree" graphical user interface element. The palm tree is chosen as an example to illustrate a customized skin to replace an original element (e.g., the indicator 502), in a manner that the customized skin shares a common theme with the television commercial 500. It is to be appreciated, however, that a theme-based skin need not necessarily be involved in other embodiments.

Various techniques may be used to generate the indicator 600 based on user-specified skin preferences. In one embodiment, the indicator 600 can comprise a graphical overlay that is placed over the original indicator 502. This may be performed, for instance, by having the client terminal 108 know the default position of the indicator 502 in the video image and having the graphical overlay positioned at that default position. In other embodiments, the client terminal 108 may perform post-processing of the incoming video stream received from the source 202 by way of the first tuner 220 in order to replace (rather than overlay) the original indicator 502 with the indicator 600, prior to presentation of the video image on the television 302.

Figure 7:
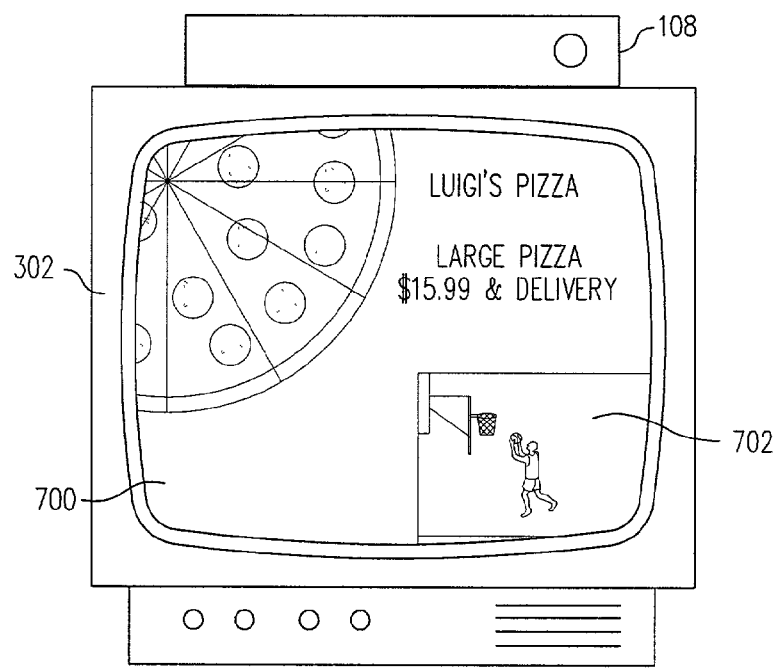
Figure 8:
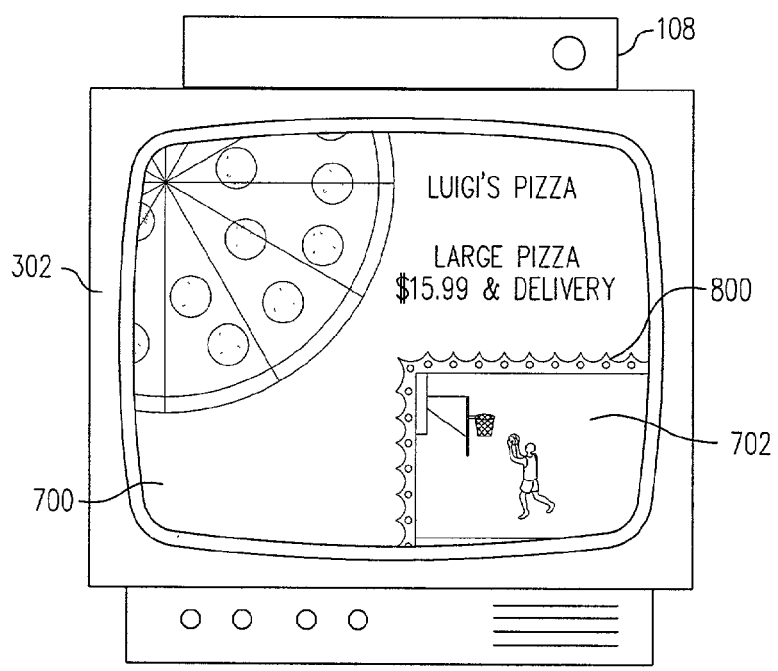

FIGS. 7–8 illustrate use of a customized skin for a picture-in-picture (PIP) configuration, pop-up window, and/or graphical overlay. In FIG. 7, a television program 700 (such as a commercial for pizza) is being presented on the television 302. Meanwhile, a basketball game is presented in a plain window 702 via PIP, pop-up window, or graphical overlay (e.g., if the basketball game presentation comprises a still shot or statistics).

FIG. 8 illustrates application of a customized skin 800 to the window 702. As depicted, the customized skin 800 can comprise any user-specified skin, which in FIG. 8 comprises a graphical design/pattern around the window 702.

The preceding examples illustrate different types of skins and levels of customization. That is, one embodiment of the invention can classify skins according to "universal skins" (total defined GUIs), "scenes" (channel-specific GUIs), and "objects" (individual elements of a GUI). With a universal skin, all of the services are universally defined in their skin by the user. As an example, if the user has universally chosen green stripes as a background color pattern, then green stripes will appear in the background of email, pop-up windows, synthetic channels, tickers, icons, and so forth. With a scene, a skin that the user has chosen for a particular channel (such as the weather channel 304 of FIGS. 3–4) will only be applied to that channel, and not to other channels. With an object, a skin of an individual element (such as the title on the weather channel 304) is customized, and the user then has a choice of applying that skin to only that title or to all other titles as well.

Figure 12:
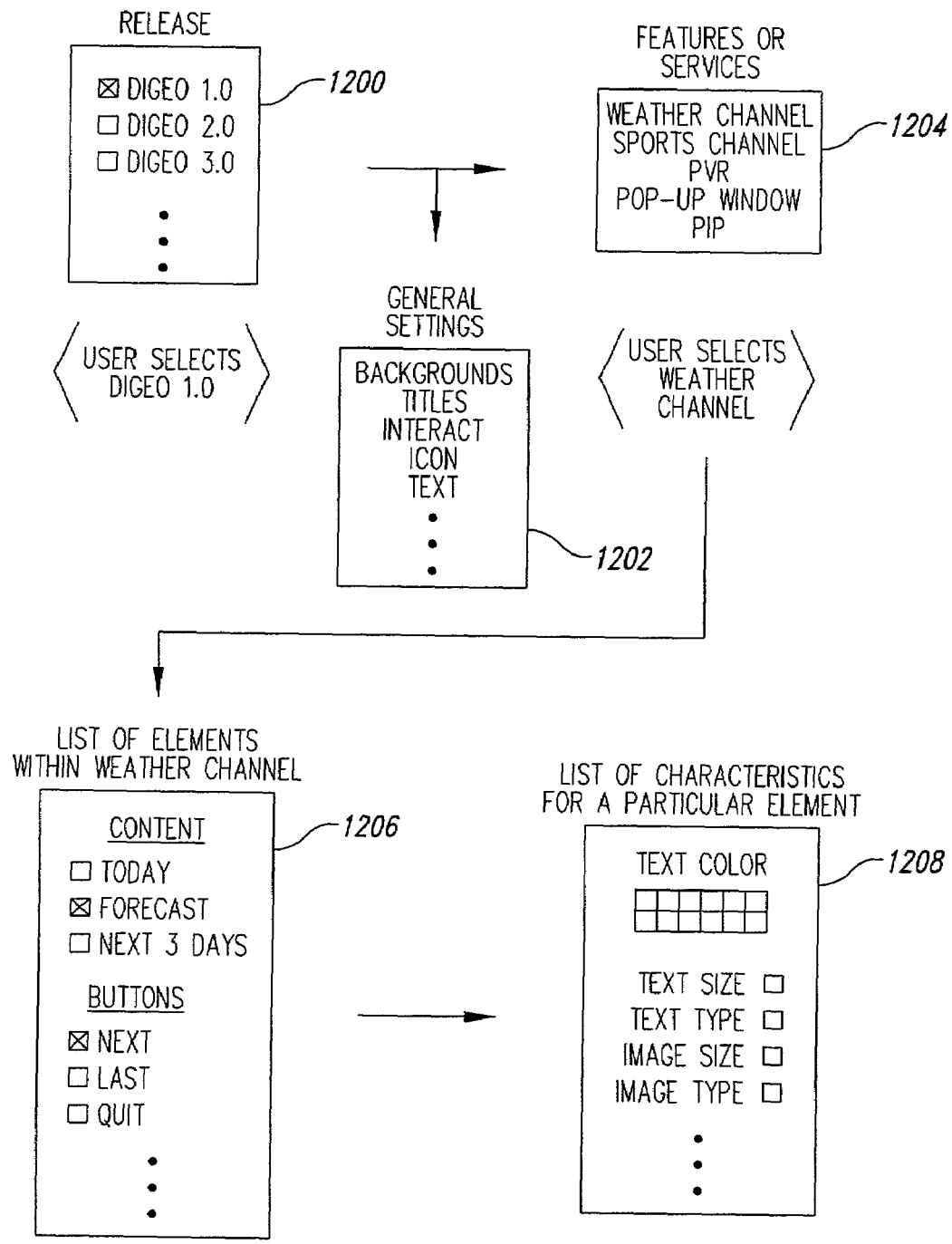
FIG. 12 illustrates example user preferences settings screens in accordance with an embodiment of the invention.

Various techniques can be used to customize a graphical user interface (e.g., universal skin, scene, or object). FIG. 12 illustrates example user preferences settings screens that can be used for customization in accordance with an embodiment of the invention. It is to be appreciated that the arrangement, number, types, and content of the various screens shown in FIG. 12 are merely illustrative of an embodiment, and can vary from one embodiment to another.

To create a universal skin, the user can proceed through several different steps and be prompted to define his settings/preferences for each. For example, skins can be matched to a release number for the interactive television service. Therefore, if the user selects "digeo 1.0" from a settings screen 1200, the user would then proceed through several steps that define each feature or service for digeo 1.0. Within each feature, the user can set different characteristics of the elements within that feature, including what to display, how it will look, where it will be displayed, and so on.

The user first enters a settings screen 1202 for global settings. Such global settings can include backgrounds, titles, interact icon, text, headlines, and so forth. Once these settings are made, then they are applied universally according to one embodiment.

Next, the user enters a settings screen 1204 for each feature or service for the selected release. For instance in FIG. 12, one of the selections in the settings screen 1204 is the weather channel 304. Within that selected service/feature of the weather channel 304, the user is provided by a settings screen 1206 with a list of possible types of weather information that can be displayed. The user can select "Today" or "Forecast" information or other elements that can be displayed in the customized GUI for the weather channel 304.

Next at a settings screen 1208, the user can choose the font type, color, font size, etc. of the selected element (e.g., "Forecast" and/or "Next" button"). The user can repeat this process for all of the features or services within a particular release until finished. In an embodiment, a file of the skin is saved and can be obtained by other users.

To create a scene for a particular feature (such as for a particular synthetic channel), the user may access one or more settings screens, such as the settings screen 1206. This screen 1206 lists elements provided by the feature. After selecting the desired elements, the user can enter each element to change its characteristics via the settings screen 1208.

To customize an object, each element has a relationship to some type of object, according to one embodiment. This relationship can be used to customize all elements within that object. For instance, the user can enter the settings screen 1206 for the weather channel 304 so as to alter the text of the title that reads "Weather Channel," and then make the alterations via the settings screen 1208. When the user finishes, the alterations can be saved just to that element (e.g., just to the "Weather Channel" title) or saved to all elements within that object (e.g., all titles belonging to a "Channel Title" object). Assuming that the "Weather Channel" title belongs to the "Channel Title" object, the user can make a menu selection to finalize changes to the individual title and then propagate the changes to the objects, thereby resulting in all titles in the object reflecting the changes.

Figure 9:
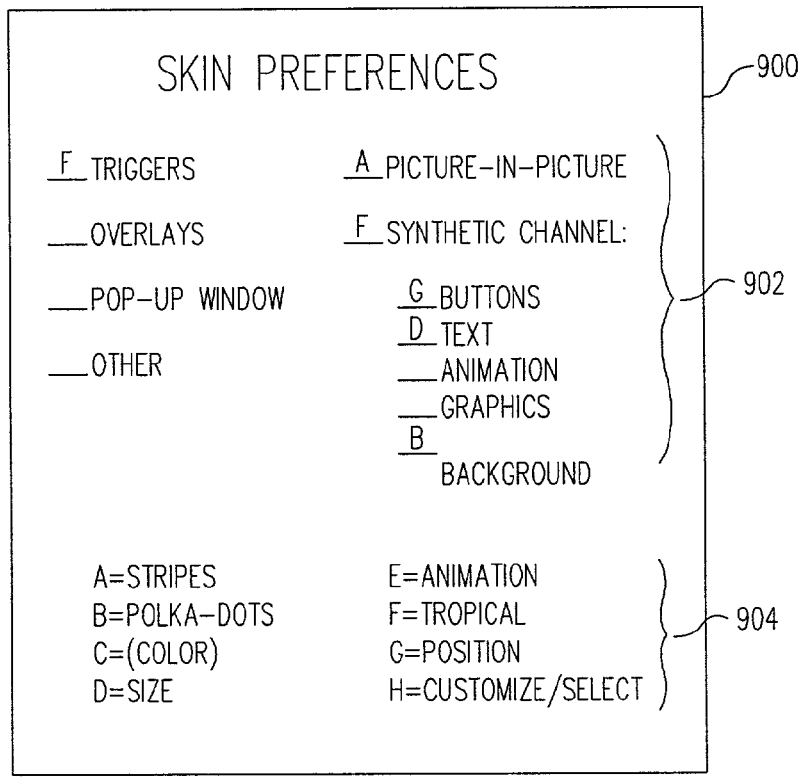
FIG. 9 illustrates an example of a user-preferences settings screen in accordance with an embodiment of the invention.

FIG. 9 illustrates another example of customizing skins via use of a user-preferences settings screen 900 in accordance with an embodiment of the invention. The screen 900 may be accessed by the user via the television 302, via a personal computer, or via some other suitable access device. The screen 900 allows the user to specify skins for various channels, for individual elements, or for other features available from the system 100. The information entered by the user via the screen 900 may be stored as the user data 224 in the storage medium 222 of the client terminal 108. Alternatively or in addition, the user-entered information may be stored at the cache(s) 110 or at some other suitable location in the system 100.

Settings 902 allow the user to set skins for various features, including triggers, pop-up windows, synthetic channels, and so forth. One or more of these features may include sub-settings, where the user may set skins at a more granular level. For instance for a particular synthetic channel, the user may choose skins for buttons, text, animation, graphics, background, and the like.

Skin selections 904 provide the user with a menu of available skins for the settings 902. As depicted in the example of FIG. 9, the user has selected a tropical theme F for triggers, stripes A for PIP windows, the tropical theme F for a specific synthetic channel (along with different skins for individual elements in the synthetic channel). As shown in the example, the user may choose from several different options, including an option H to customize/select from choices that are not otherwise provided for in the screen 900. This option may include downloading or creating new skins in one embodiment.

Figure 10:
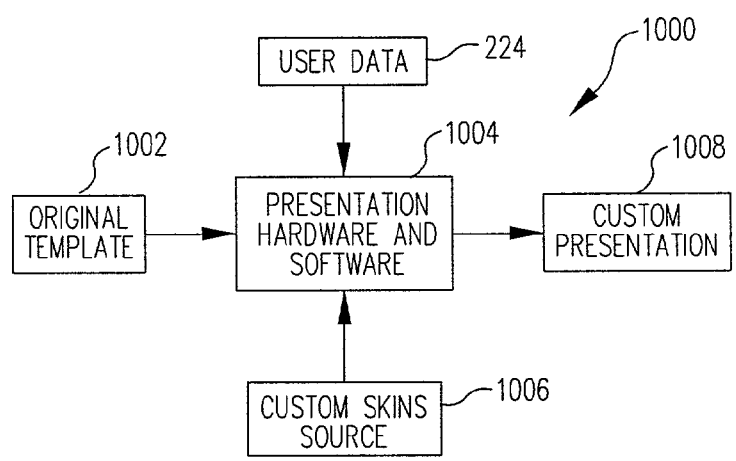
FIG. 10 is a block diagram depicting a system that may be used to provide customized graphical user interface features in accordance with an embodiment of the invention.

FIG. 10 is a block diagram depicting a system 1000 that may be used to provide customized GUI features in accordance with an embodiment of the invention. Components of the system 1000 may be embodied in whole or in part by the system 100 and/or the client terminal 108 depicted in FIGS. 1 and 2, respectively. An embodiment of the system 1000 includes an original template 1002, the user data 224, presentation hardware and software 1004, a customized skin source 1006, and a custom presentation 1008.

The original template 1002 can include a front-end or back-end web page template, such as a hypertext markup language (HTML) or extensible markup language (XML) page. The template 1002 can also include default settings for graphical overlays, pop-up windows, or PIP windows, as specified by settings at the client terminal 108 or by configuration information sent along with received input video stream. The template 1002 can further include templates for other applications available from the system 100, such as e-mail, electronic program guides, messages from a service provider, instant messaging, and so forth. The original template(s) 1002 may be stored at a server, transmitted to the client terminal 108, stored at the client terminal 108, or any suitable combination thereof.

The presentation hardware and software 1004 may be located at a server or at the client terminal 108, and operates in one embodiment to review the template 1002 to determine if there are any customizable GUI features therein. In an embodiment, the presentation hardware and software 1004 correlates the user data 224 that includes the user's skin settings (such as depicted in FIG. 9) with skins available from a custom skins source 1006.

The custom skins source 1006 can be embodied in several possible ways. In one embodiment, the custom skins source 1006 can comprise the storage medium 222 that has had custom skins corresponding to the user settings stored therein, such as via downloading from the system 100. In another embodiment, the custom skins source 1006 may be at the cache 110, such that skin substitution may be performed prior to transmission of the content to the client terminal 108. The resulting custom presentation 1008, therefore, is performed remotely from the client terminal 108.

In an embodiment, the user can access an area within or outside the service provider's service to select the custom skins source 1006. The area can be a web site, a database, a list of files in a server, a "friend's box," or other location suitably configured to store skins as files. Once the user obtains a file from the customs skins source 1006, the file appears in the user's personal list of skins. The personal list can display the overall look of each skin, and provide information as to how data is delivered, who created the skin and when, and so forth. In one embodiment where the skin defines the total graphical/textual user interface (e.g., a universal skin), no other settings are needed from the user. The skin will define how a synthetic channel will look, and what elements it would display, where such elements would be positioned, and so forth.

In yet another embodiment, the custom skins source 1006 can comprise a channel that performs a carousel broadcast of skins for downloading or for real-time "silent tuning." With this real-time silent tuning, as an example, a live television broadcast received from the first tuner 200 can be overlaid by a user-selected graphical skin that is received in-real time by the second tuner 210, thereby presenting the custom presentation 1008.

Another embodiment of the system 1000 operates based on triggers or PIDs as follows. One or more applications are received in a stream via one of the tuners of the client terminal 108, and are loaded into memory (e.g., the storage medium 222). Packets in the stream may include a PID (such as "PID #7") to identify which application that packet belongs to (e.g., packets with a PID #7 belong to Application #7, and are picked off from the stream and loaded into memory with the other PID #7 packets). The packets with PID #7 may include program elements, graphical elements, and other elements used in connection with operation of the application.

In the same stream or in a separate stream, there may be packets with a customization PID (e.g., PID #1024 as an example). The PID #1024 may be included with the packets having the PID #7 or it may be separate. The PID #1024 may identify a specific customization schema/skin, or it may operate as an identifier that the packet that it corresponds to is a customizable element. The custom skins source 1006, in this embodiment therefore, can comprise a stream having skins loaded therein, such as a separate carousel stream or the same stream that includes the application packets.

Next, in an embodiment, the presentation hardware and software 1004 picks off the packets having PID #1024 from the stream, and loads these packets into memory. Then, the presentation hardware and software 1004 overlays these PID #1024 elements over the PID #7 elements in the appropriate portion of the GUI, in a manner that the PID #1024 elements and their placement correspond to the user settings. It is to be appreciated that in other embodiments, the PID #1024 packets need not necessarily be extracted from incoming streams if the corresponding skins have already been previously downloaded into the storage medium 222, in which case they are loaded from the storage medium 222 when the overlay is performed.

Figure 11:
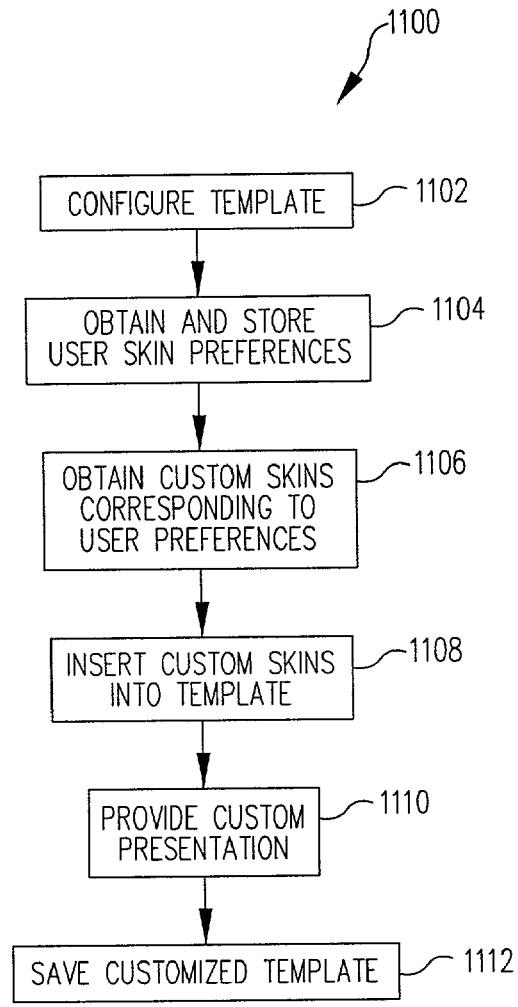
FIG. 11 is a flow diagram of a method to provide customized graphical user interface features in accordance with an embodiment of the invention.

FIG. 11 is a flow diagram of a method 1100 to provide customized graphical user interface features in accordance with an embodiment of the invention. The method 1100 may be viewed in conjunction with the system 1000 of FIG. 10. Beginning at a block 1102, a front-end or back-end template is configured to allow for customization of elements therein. For example, portions of the HTML page for a synthetic channel may be tagged to identify elements that can be replaced by user-selected skins. As further illustrations, Flash, HTML JavaScript™, or Java™ coding may be generated for the application to dynamically request alternate elements based on the user data 224. Also, as described above, certain customizable packets in a stream or other signal may be identified with PIDs or triggers.

At a block 1104, user skin preferences are obtained and stored. In one embodiment, this may be performed by having the user access the screens shown in FIG. 12 or in FIG. 9 and specify skin settings therein. Custom skins corresponding to user settings are obtained at a block 1106, such as via downloading, selection from previously stored skins (e.g., locally at the client terminal 108 or at a server), extracting skins from a carousel broadcast or from packets in a stream, and so forth.

At a block 1108, the custom skins are inserted into the template, such as at the back-end or at the front-end at the client terminal 108. As described above, this insertion into the template may be performed via overlays, video post-processing, and other techniques. The custom presentation 1008 is provided at a block 1110. At a block 1112, the templates having the customized skins can be saved, such that the user does not need to re-configure the templates repeatedly. For systems 100 that support log-in capability for multiple users in a household, with each user having their own set of skin preferences, the customized templates can be saved at the block 1112 for the specific user.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention.

For instance, a satellite television (TV) delivery system may be implemented alternatively or in addition to a cable distribution system. A satellite TV delivery system may comprise a direct broadcast satellite (DBS) system. A DBS system may comprise a small 18-inch satellite dish (which is an antenna for receiving a satellite broadcast signal); a digital integrated receiver/decoder (IRD), which separates each channel, and decompresses and translates the digital signal so a television can show it; and a remote control. Programming for a DBS system may be distributed, for example, by multiple high-power satellites in geosynchronous orbit, each with multiple transponders. Compression (e.g., MPEG) is used to increase the amount of programming that can be transmitted in the available bandwidth.

A digital broadcast center (e.g., analogous to the head-end 204) may be used to gather programming content, ensure its digital quality, and transmit the signal up to the satellites. Programming may come to the broadcast center from content providers (TBS™, HBO™, CNN™, ESPN™, etc.) via satellite, fiber optic cable, and/or special digital tape. Satellite-delivered programming is typically immediately digitized, encrypted and uplinked to the orbiting satellites. The satellites retransmit the signal back down to every earth-station—or, in other words, every compatible DBS system receiver dish at customers' homes and businesses.

Some programs may be recorded on digital videotape in the broadcast center to be broadcast later. Before any recorded programs are viewed by customers, technicians may use post-production equipment to view and analyze each tape to ensure audio and video quality. Tapes may then be loaded into a robotic tape handling system, and playback may be triggered by a computerized signal sent from a broadcast automation system. Back-up videotape playback equipment may ensure uninterrupted transmission at all times.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for an interactive video casting network, the method comprising:
   providing for user selection a display of a plurality of user interface elements for services available from the interactive video casting network;
   storing user settings corresponding to user-selection from the displayed plurality of user interface elements; and
   for at least one of the services and based on the stored user settings, presenting a user interface that includes therein at least one user interface element selected from the displayed plurality of user interface elements, wherein the user interface comprises a graphical skin that is received by a second tuner and overlaid on a broadcast received from a first tuner.

2. The method of claim 1, further comprising configuring a template for the service having the user interface to specify an element that is replaceable by the selected user interface element.

3. The method of claim 1 wherein the user interface is presented in a channel of the interactive video casting network.

4. The method of claim 1 wherein presenting the user interface that includes the selected user interface element comprises presenting an original trigger indicator with a substitute trigger indicator.

5. The method of claim 1 wherein presenting the user interface that includes the selected user interface element comprises providing the user interface element with at least one a pattern, color, background, shape, location, animation, text style, size, design, and theme that is different than that of an original user interface element.

6. The method of claim 1 wherein presenting the user interface that includes the selected user interface element comprises including the user interface element in the user interface prior to providing the user interface to a client terminal.

7. The method of claim 1 wherein providing for user selection a display of the plurality of user interface elements for services available from the interactive video casting network includes providing the user interface elements via a carousel broadcast from the interactive video casting network.

8. The method of claim 1 wherein presenting the user interface that includes the selected user interface element comprises:
   providing a stream having packets, for the user interface, identified as being replaceable by user interface elements from the selection of the plurality of user interface elements;
   based on the user settings, obtaining replacement packets corresponding to the packets identified as being replaceable; and
   replacing elements corresponding to the packets identified as being replaceable with elements corresponding to the replacement packets.

9. The method of claim 8 wherein the replacement packets are obtained from at least one of another stream and from a local storage medium.

10. The method of claim 1 wherein the service having the user interface that includes the selected user interface element comprises at least one of a graphical overlay, pop-up window, button, icon, picture-in-picture screen, e-mail, instant message, and trigger.

11. An article of manufacture, comprising:
    a machine-readable medium usable for an interactive video casting network and having instructions stored thereon to:
      provide for user selection a display of a plurality of user interface elements for services available from the interactive video casting network;
      store user settings corresponding to user-selection from the displayed plurality of user interface elements; and
      for at least one of the services and based on the stored user settings, present a user interface that includes therein at least one user interface element selected from the displayed plurality of user interface elements by
        processing a stream having packets, for the user interface, identified as being replaceable by user interface elements from the selection of the plurality of user interface elements;
        based on the user settings, obtaining replacement packets corresponding to the packets identified as being replaceable; and
        replacing elements corresponding to the packets identified as being replaceable with elements corresponding to the replacement packets.

12. The article of manufacture of claim 11 wherein the instructions to present the user interface that includes the selected user interface element comprises instructions to present an original trigger indicator with a substitute trigger indicator.

13. The article of manufacture of claim 11 wherein the instructions to present the user interface that includes the selected user interface element comprises instructions to include the user interface element in the user interface prior to providing the user interface to a client terminal.

14. A system, comprising:
    a means for providing for user selection a display of a plurality of user interface elements for services available from an interactive video casting network;
    a means for storing user settings corresponding to user-selection from the displayed plurality of user interface elements; and
    for at least one of the services and based on the stored user settings, a means for presenting a user interface that includes therein at least one user interface element selected from the displayed plurality of user interface elements, wherein the user interface comprises a graphical skin that is received by a second tuner and overlaid on a broadcast received from a first tuner.

15. The system of claim 14 wherein the means for presenting the user interface that includes the selected user interface element comprises a means for presenting an original trigger indicator with a substitute trigger indicator.

16. The system of claim 14 wherein the means for presenting the user interface that includes the selected user interface element comprises:
- a means for processing a stream having packets, for the user interface, identified as being replaceable by user interface elements from the selection of the plurality of user interface elements;
- a means for obtaining replacement packets corresponding to the packets identified as being replaceable, based on the user settings; and
- a means for replacing elements corresponding to the packets identified as being replaceable with elements corresponding to the replacement packets.

17. The system of claim 16 wherein the means for obtaining the replacement packets comprises a carousel broadcast channel.

18. A user interface for a service available from an interactive video casting network, the user interface comprising:
- a display area to display information provided via the service;
- a user interface element integrated with the display area and selected from a plurality of available user interface elements based on user settings; and
- an application that integrates the display area and user interface element into the service,
- wherein the user settings indicate a user interface element previously selected by the user of the application from a display of the plurality of available user interface elements, wherein the user interface element comprises a graphical skin that is configured and arranged to be received by a second tuner and overlaid on a broadcast received from a first tuner.

19. The user interface of claim 18 wherein the user interface element comprises a replacement trigger indicator to replace an original trigger indicator.

20. The user interface of claim 18, further comprising a settings screen to allow a user to provide the user settings.

21. The user interface of claim 18 wherein the application is provided by way of a plurality of packets in a stream, the stream including identifiers to identify certain packets in the stream that are replaceable with packets corresponding to the selected user interface element.

22. An apparatus for an interactive video casting network, the apparatus comprising:
- a storage medium to store user data corresponding to user settings related to a plurality of user interface elements for features available via the interactive video casting network, wherein the user settings are supplied by a user of the features available via the interactive video casting network;
- at least one tuner to receive an application capable to present a user interface; and
- a processor coupled to the storage medium and to the tuner to determine if the user interface includes a replaceable component and to select a user interface element, based on the user settings in the storage medium, to replace the replaceable component, if the user interface is determined to include the replaceable component, by
    - processing a stream having packets, for the user interface, identified as being replaceable;
    - based on the user settings, obtaining replacement packets corresponding to the packets identified as being replaceable.

23. The apparatus of claim 22 wherein the storage medium is capable to store the selected user interface element.

24. The apparatus of claim 22 wherein the processor is capable to select the user interface element from a stream received via the tuner.

25. The apparatus of claim 22 wherein the replaceable component comprises a trigger indicator that accompanies a received signal.

26. A system for an interactive video casting network, the system comprising:
- a template for an application associated with a feature available from the interactive video casting network, the template including a user interface;
- a storage unit to store user settings related to user-specified skins usable with features from the interactive video casting network;
- a source capable to provide skins in accordance with the user settings stored in the storage unit; and
- a component coupled to receive the template and coupled to communicate with the storage unit and with the source, the component including hardware and software to determine if the template includes a customizable user interface element that can be replaced by a skin available from the source based on the user settings stored in the storage unit,
- wherein if the component determines that the template includes the customizable user interface element, the component is capable to obtain one of the skins from the source that corresponds to the user settings and to include the obtained skin into the template as a customized presentation at a client terminal by
    - processing a stream having packets, for the user interface, identified as being replaceable; and
    - based on the user settings, obtaining replacement packets corresponding to the packets identified as being replaceable.

27. The system of claim 26 wherein the source capable to provide skins comprises a channel having a broadcast of skins.

28. The system of claim 26 wherein the template comprises a web page template.

29. The system of claim 26 wherein the source capable to provide skins comprises a storage medium coupled to the client terminal.

30. The system of claim 26 wherein the storage unit is coupled remotely from the client terminal.

31. The system of claim 26 wherein the source capable to provide the skins comprises a first stream, wherein the application is provided by way of a second stream having packets therein that identify the replaceable user interface element of the user interface of the application, and wherein the component is capable to detect the identified packets in the second stream and to obtain a skin from the first stream that corresponds as a replacement for the identified packets in the second stream.

32. The system of claim 31 wherein the first stream is obtained from a local storage medium coupled to the client terminal and having replacement skins stored therein.

33. A method for an interactive video casting network, the method comprising:
- providing a selection of a plurality of user interface elements for services available from the interactive video casting network,
    - wherein a client terminal for a television for the interactive video casting network is coupled to present the user interface elements on a television, wherein the television includes a screen to present the services available from the interactive video casting network, wherein the client terminal is capable of being communicatively coupled to the interactive video casting network to receive the services from the interactive video casting network and is coupled to present at least some of the user interface elements in conjunction with the services on the screen of the television, wherein the interactive video casting network includes a plurality of content sources communicatively coupled to a plurality of broadcast centers, wherein the broadcast centers are coupled to storage units to store at least some of the user interface elements to be made available to the client terminal, and wherein the interactive video casting network is capable to provide the services to the client terminal via different communication channels, including at least one of a plurality of television broadcast channels and a communication channel with a communication network;

storing user settings corresponding to user-selection from the plurality of user interface elements; and for at least one of the services and based on the stored user settings, presenting a user interface that includes therein at least one user interface element selected from the selection of the plurality of user interface elements, wherein the user interface comprises a graphical skin received by a second tuner and overlaid on a broadcast received from a first tuner.

34. The method of claim 33 wherein the interactive video casting network comprises an interactive television network.

35. The method of claim 33 wherein the broadcast centers comprise part of a satellite television delivery system.

36. The method of claim 33 wherein one of the services comprises a ticker having the user interface including the selected user interface element.

37. A method for an interactive video casting network, the method comprising:

providing a selection of a plurality of user interface elements for services available from the interactive video casting network, wherein a client terminal for a television for the interactive video casting network is coupled to present the user interface elements on a television, wherein the television includes a screen to present the services available from the interactive video casting network, wherein the client terminal is capable of being communicatively coupled to the interactive video casting network to receive the services from the interactive video casting network and is coupled to present at least some of the user interface elements in conjunction with the services on the screen of the television, wherein the interactive video casting network includes a plurality of content sources communicatively coupled to a plurality of broadcast centers, wherein the broadcast centers are coupled to storage units to store at least some of the user interface elements to be made available to the client terminal, and wherein the interactive video casting network is capable to provide the services to the client terminal via different communication channels, including at least one of a plurality of television broadcast channels and a communication channel with a communication network;

storing user settings corresponding to user-selection from the plurality of user interface elements; and for at least one of the services and based on the stored user settings, presenting a user interface that includes therein at least one user interface element selected from the selection of the plurality of user interface elements, wherein presenting the user interface that includes the selected user interface element includes:

providing a stream having packets, for the user interface, identified as being replaceable by user interface elements from the selection of the plurality of user interface elements;

based on the user settings, obtaining replacement packets corresponding to the packets identified as being replaceable; and replacing elements corresponding to the packets identified as being replaceable with elements corresponding to the replacement packets.

38. The method of claim 37 wherein the interactive video casting network comprises an interactive television network.

39. The method of claim 37 wherein the broadcast centers comprise part of a satellite television delivery system.

* * * * *